(12) United States Patent
Kim

(10) Patent No.: US 8,888,164 B2
(45) Date of Patent: Nov. 18, 2014

(54) CONNECTING STRUCTURE FOR HEAVY VEHICLE

(71) Applicant: Hyundai Motor Company, Seoul (KR)

(72) Inventor: Munjin Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/770,565

(22) Filed: Feb. 19, 2013

(65) Prior Publication Data

US 2014/0097635 A1     Apr. 10, 2014

(30) Foreign Application Priority Data

Oct. 5, 2012   (KR) .......................... 10-2012-0110938

(51) Int. Cl.
  *B62D 27/02*   (2006.01)
  *B62D 21/02*   (2006.01)
  *B62D 21/12*   (2006.01)
  *B62D 25/20*   (2006.01)

(52) U.S. Cl.
  CPC ................ *B62D 27/02* (2013.01); *B62D 21/02* (2013.01); *B62D 21/12* (2013.01); *B62D 25/2054* (2013.01)
  USPC ..................... 296/178; 296/184.1; 296/203.03

(58) Field of Classification Search
  CPC ............. B62D 25/025; B62D 25/2036; B62D 27/065; B62D 31/025; B62D 31/02; B62D 47/02

USPC .......... 296/178, 184.1, 186.1, 203.03, 209, 29
See application file for complete search history.

(56) References Cited

U.S. PATENT DOCUMENTS

| | | | |
|---|---|---|---|
| 6,334,642 B1 * | 1/2002 | Waldeck et al. | 296/29 |
| 8,414,068 B1 * | 4/2013 | Na et al. | 296/193.06 |
| 2008/0036240 A1 * | 2/2008 | Lusk et al. | 296/178 |
| 2010/0148537 A1 * | 6/2010 | Stanton | 296/203.01 |
| 2012/0153682 A1 * | 6/2012 | Rawlinson et al. | 296/209 |

FOREIGN PATENT DOCUMENTS

| | | | |
|---|---|---|---|
| JP | 6-65164 U | | 9/1994 |
| KR | 1998-024043 U | | 7/1998 |
| WO | WO-85/05337 | * | 5/1985 |

OTHER PUBLICATIONS

Machine tranlation of WO85/05337, printed from the EPO website on Mar. 6, 2014.*

* cited by examiner

*Primary Examiner* — Jason S Morrow

(74) *Attorney, Agent, or Firm* — Morgan, Lewis & Bockius LLP

(57) ABSTRACT

A connecting structure for a heavy vehicle may include a floor frame, a side pillar, and a skirt rail having a side rail to be selectively connected with the floor frame and an upper rail to be selectively connected with the side pillar, wherein the floor frame and the side rail may be joined together by a first fastening member and the side pillar and the skirt rail may be joined to each other by a second fastening member.

13 Claims, 5 Drawing Sheets

CONNECTING STRUCTURE FOR HEAVY VEHICLE

CROSS-REFERENCE TO RELATED APPLICATION

The present application claims priority to Korean Patent Application No. 10-2012-0110938 filed on Oct. 5, 2012, the entire contents of which is incorporated herein for all purposes by this reference.

BACKGROUND OF THE INVENTION

1. Field of the Invention

The present invention relates to a connecting structure for a heavy vehicle. More particularly, the present invention relates to a connecting structure of a side pillar and a floor frame of a heavy vehicle such as a bus, and the like.

2. Description of Related Art

In the case of a heavy vehicle, particularly, a heavy vehicle such as a bus, and the like, an influence of a weight exerted on fuel efficiency is relatively large, and as a result, lightness of the vehicle is required.

In the heavy vehicle, primary components are made of iron for safety, but an addition use of a material which is relatively light, such as aluminum is required to achieve lightness of a heavy vehicle for passengers.

A connecting structure which is more stable and is easily assembled is required to couple the structure of the iron material and the aluminum material for lightness.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a connecting structure of a side pillar and a floor frame of a heavy vehicle such as a bus, and the like, which maintains rigidity of a vehicle, is relatively light, and is easily assembled.

In an aspect of the present invention, a connecting structure for a heavy vehicle, may include a floor frame, a side pillar, and a skirt rail having a side rail to be selectively connected with the floor frame and an upper rail to be selectively connected with the side pillar, wherein the floor frame and the side rail are joined together by a first fastening member and the side pillar and the skirt rail are joined to each other by a second fastening member.

The connecting structure for the heavy vehicle may further may include a floor bracket coupled with the floor frame, wherein the floor bracket is joined to the side rail.

The side rail is formed in a length direction of the vehicle.

The connecting structure for the heavy vehicle may further may include a side bracket coupled with the side pillar, wherein the side bracket is joined to the upper rail.

The upper rail is formed in a length direction of the vehicle.

The skirt rail may include a plurality of reinforcement panels formed therein in a length direction of the vehicle.

The first fastening member is a bolt having a bolt head mounted inside the side rail.

A bolt carrier is provided between the side rail and the bolt to couple the bolt to the side rail.

A carrier chamber is formed on the side rail and the bolt carrier is inserted into the carrier chamber, wherein an outer surface of the bolt carrier is formed to be inclined toward the bolt head.

A portion of the side rail is inclined toward the bolt carrier, wherein the outer surface of the bolt carrier is mounted onto the portion of the side rail.

The bolt may include a protrusion having a slanted surface, wherein the protrusion is coupled with the bolt carrier.

A washer is mounted onto the protrusion and a nut is mounted onto the slanted surface.

The second fastening member is a bolt having a bolt head mounted inside the upper rail.

A bolt carrier is provided between the upper rail and the bolt.

A carrier chamber is formed on the upper rail and the bolt carrier is inserted into the carrier chamber, wherein an outer surface of the blot carrier is formed to be inclined toward the bolt head.

A portion of the upper rail is inclined toward the bolt carrier, wherein the outer surface of the bolt carrier is mounted onto the portion of the upper.

The bolt may include a protrusion having a slanted surface, wherein the protrusion is coupled with the bolt carrier and a nut is mounted onto the slanted surface.

A washer is mounted onto the protrusion.

The skirt rail is formed by a material including aluminum.

The floor frame is formed by a material including iron.

According to an exemplary embodiment of the present invention, in a connecting structure for a heavy vehicle, since a weight of a vehicle can be reduced, fuel efficiency can be improved.

A structure of a connection part is modulated to save production cost.

Since a welding process can be omitted in connection, thermal deformation by welding and distortion of the vehicle can be prevented, assembling is easy, and tolerance management may be easy.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
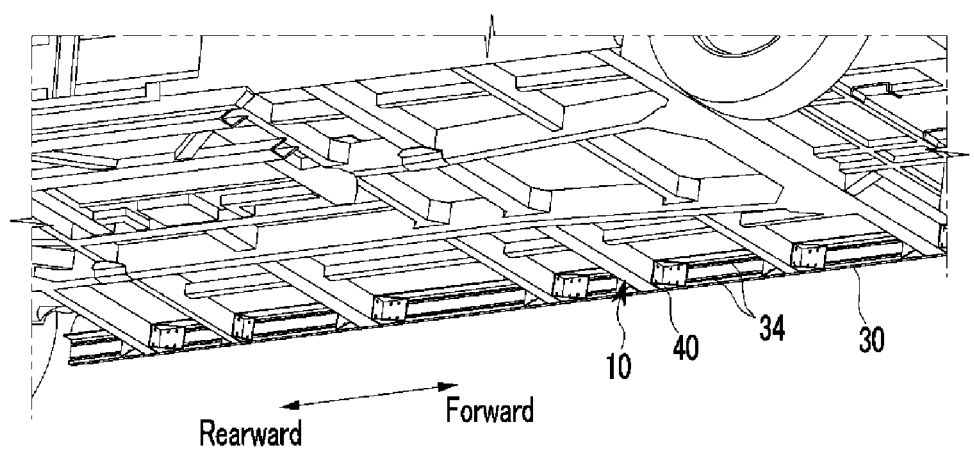
FIG. 1 is a perspective view of a connecting structure for a heavy vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Throughout the specification, like reference numerals refer to like elements.

In the drawings, the thickness of layers, films, panels, regions, etc., are exaggerated for clarity.

It will be understood that when a layer, a film, an area, a plate, and the like are referred to as being "on" another layer or substrate, it can be directly on the other layer or substrate, or intervening them may also be present.

In contrast, when an element is referred to as being "directly on" another element, there are no intervening elements present.

Throughout the specification, unless explicitly described to the contrary, the word "include" and variations such as "includes" or "including", will be understood to imply the inclusion of stated elements but not the exclusion of any other elements.

An exemplary embodiment of the present invention will hereinafter be described in detail with reference to the accompanying drawings.

Figure 2:
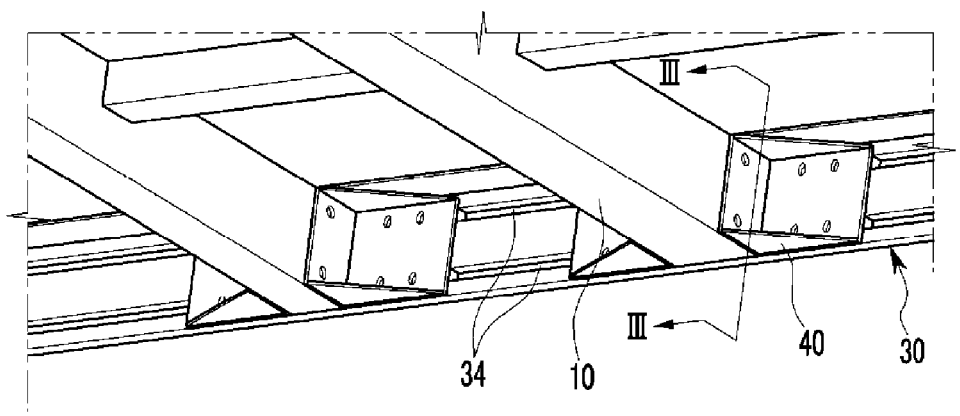
FIG. 2 is a partially enlarged diagram of FIG. 1.
Figure 3:
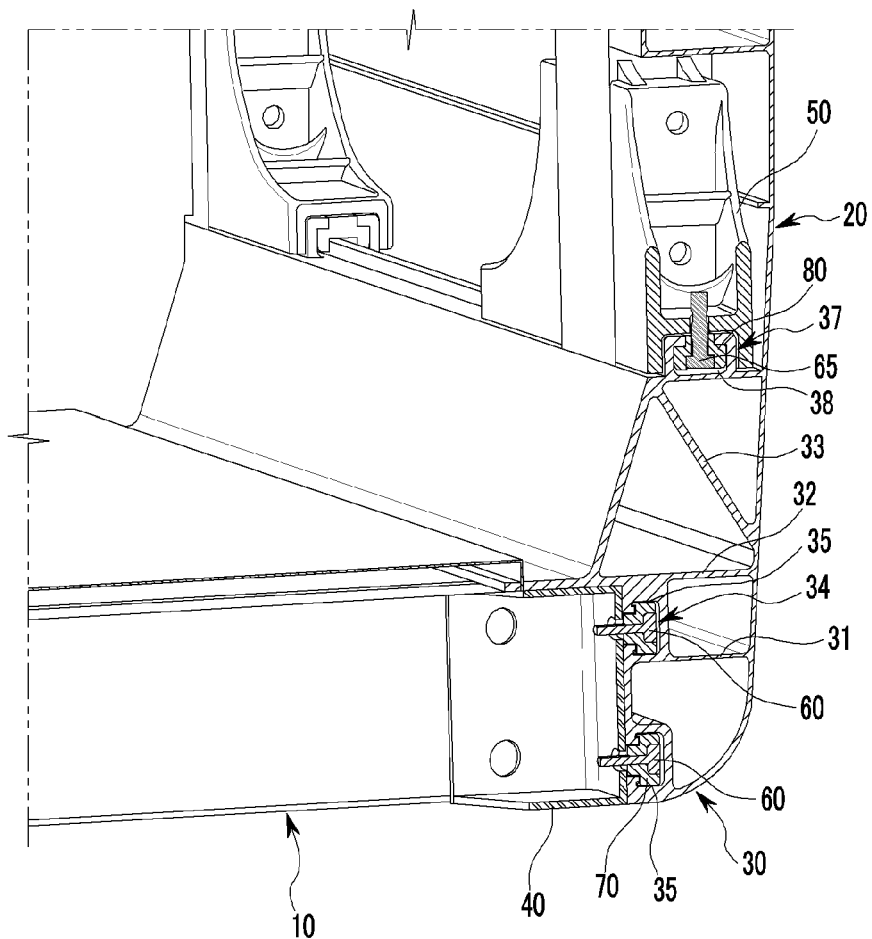
FIG. 3 is a cross-sectional view taken along line III-III of FIG. 2.

FIG. 1 is a perspective view of a connecting structure for a heavy vehicle according to an exemplary embodiment of the present invention, FIG. 2 is a partially enlarged diagram of FIG. 1, and, FIG. 3 is a cross-sectional view taken along line III-III of FIG. 2.

Referring to FIGS. 1 to 3, a connecting structure for a heavy vehicle according to an exemplary embodiment of the present invention includes a floor frame 10 forming a floor of a vehicle, a side pillar 20 provided on the side of the vehicle, and a skirt rail 30 having a side rail 34 to be connected with the floor frame 10 and an upper rail 37 to be connected with the side pillar 20. The floor frame 10 and the side rail 34 and the side pillar 20 and the skirt rail 30 may be joined to each other by using bolts 60 and 65, respectively.

The connecting structure for a heavy vehicle further includes a floor bracket 40 coupled with the floor frame 10, the floor bracket 40 may be joined to the side rail 34, and the side rail 34 may be formed in a length direction of the vehicle.

The connecting structure for a heavy vehicle further includes a side bracket 50 coupled with the side pillar 20, the side bracket 50 may be joined to the upper rail 37, and the upper rail 37 may be formed in the length direction of the vehicle.

The skirt rail 30 may include a plurality of reinforcement panels 31, 32, and 33 formed therein in the length direction of the vehicle, and as a result, rigidity of the skirt rail 30 may be increased by the reinforcement panels 31, 32, and 33.

The skirt rail 30 may be formed by a material including aluminum and the floor frame 10 may be formed by a material including iron.

In the connecting structure for a heavy vehicle according to the exemplary embodiment of the present invention, the skirt rail 30 may be formed by the material including aluminum, and thus a weight of the entire vehicle may be relatively decreased and further, fuel efficiency may be improved.

Since the floor frame 10 and the skirt rail 30, and the side pillar 20 and the skirt rail 30 may be joined to each other without welding, thermal deformation by welding and distortion of the vehicle may be prevented.

Figure 4:
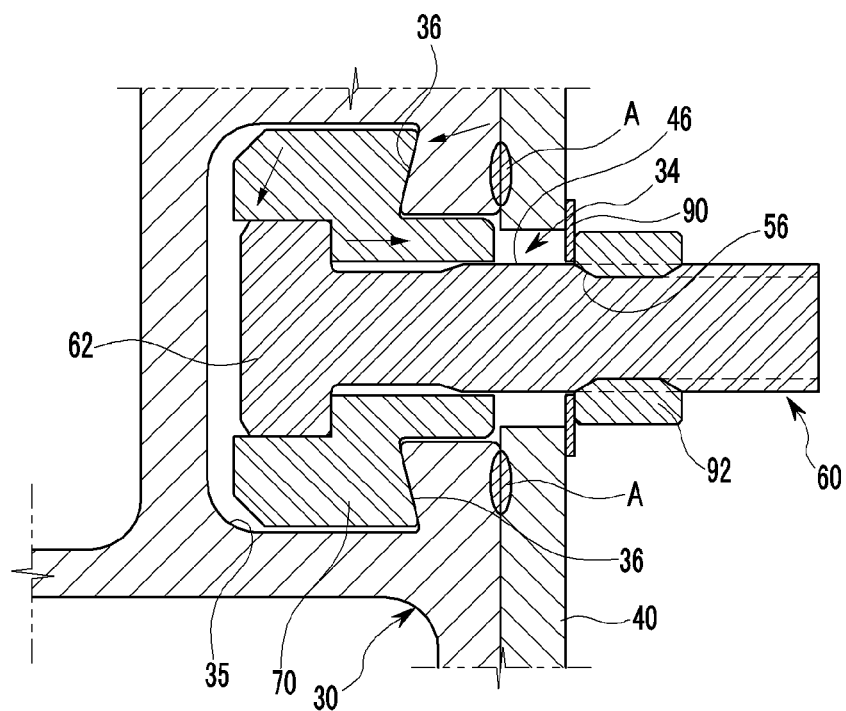
FIGS. 4 and 5 are diagrams illustrating a connecting configuration of a floor frame and a side pillar of a connecting structure for a heavy vehicle according to an exemplary embodiment of the present invention.
Figure 5:
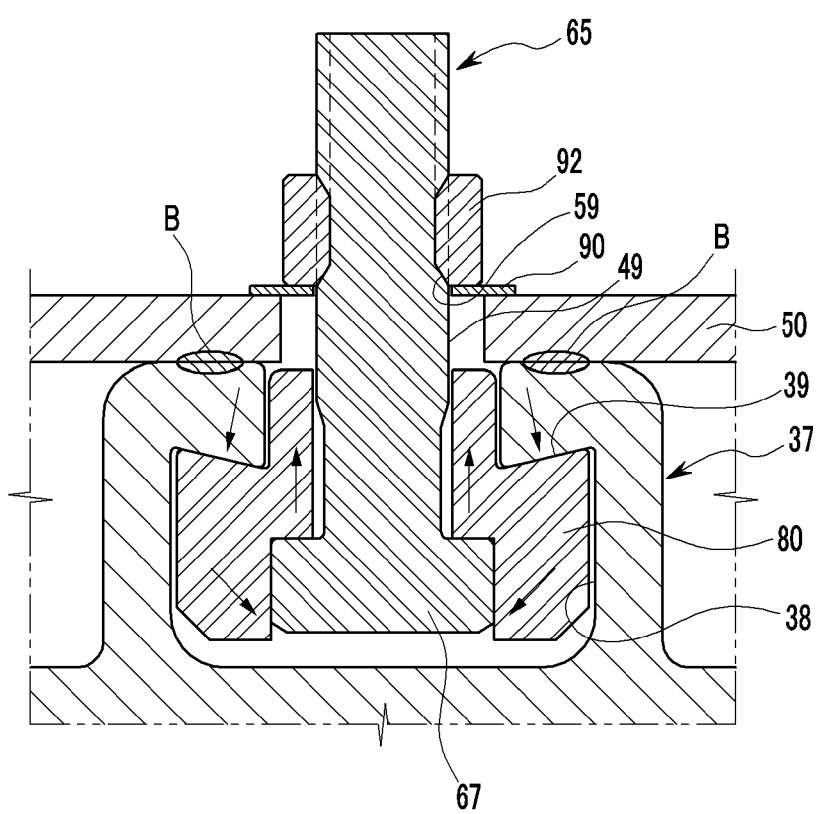

FIGS. 4 and 5 are diagrams illustrating a connecting configuration of a floor frame and a side pillar of a connecting structure for a heavy vehicle according to an exemplary embodiment of the present invention. Referring to FIG. 4, a bolt head 62 may be provided inside the side rail 34.

A bolt carrier 70 may be provided between the side rail 34 and the bolt 60.

A carrier chamber 35 is formed on the side rail 34 and the bolt carrier 70 is inserted into the carrier chamber 35, and an outer surface 36 of the bolt carrier 70 may be formed to be inclined with a predetermined angle toward the bolt head 62. A portion of the skirt rail 30 corresponding to the outer surface 36 may be inclined with the corresponding angle toward the bolt head 62.

The bolt 60 includes a protrusion 46 having a slanted surface 56. The bolt carrier 70 may be mounted to the protrusion 46.

Referring to FIG. 5, a bolt head 67 may be provided inside the upper rail 37.

A bolt carrier 80 may be provided between the upper rail 37 and the bolt 65.

A carrier chamber 38 is formed on the upper rail 37 and the bolt carrier 80 is inserted into the carrier chamber 38, and an outer surface 39 of the bolt carrier 80 may be formed to be inclined with a predetermined angle toward the bolt head 67. A portion of the upper rail 37 corresponding to the outer surface 39 may be inclined with the corresponding angle toward the bolt head 67.

The bolt 65 includes a protrusion 49 having a slanted surface 59. The bolt carrier 80 may be mounted to the protrusion 49.

In FIGS. 4 and 5, the respective bolts 60 and 65 are coupled with the floor bracket 40 and the side pillar 50, respectively through a washer 90 and a nut 92, wherein the washers 90 may be mounted to the protrusions 46 and 49 respectively and nuts 92 may be mounted on the slanted surfaces 56 and 59 of the protrusions 46 and 49 respectively. In this configuration, the slanted surfaces 56 and 59 increase a contact surface between the nuts 92 and the bolts 60 and 65 such that the nuts 92 can be coupled to the bolts 60 and 65 firmly.

As illustrated in FIGS. 4 and 5, in the connecting structure for a heavy vehicle according to the exemplary embodiment of the present invention, the bolt carriers 70 and 80 are used, and as a result, planes A and B supported by bolting are relatively broadened, which is advantageous for securing rigidity.

Further, when the bolt heads 62 and 67 push the bolt carriers 70 and 80 as the bolts 60 and 65, and the nut 92 are fastened, force is transferred in an arrow direction illustrated in the figure to prevent the bolts 60 and 65 from being released.

Since the floor frame 10 and the skirt rail 30, and the side pillar 20 and the skirt rail 30 are coupled to each other through the side rail 34 and the upper rail 37, assembling is easy and tolerance management may be easy.

That is, since the floor frame 10 and the skirt rail 30, and the side pillar 20 and the skirt rail 30 are coupled to each other by using the side rail 34 and the upper rail 37, an assembling hole for coupling to a predetermined position, and the like need not be separately formed, and although production tolerance of the floor frame 10, the skirt rail 30, and the side pillar 20 is generated, assembling is easy.

Since the side rail 34 and the upper rail 37 are used, production cost may be saved by modulating a structure of a connection part.

The side rail 34 and the upper rail 37 may serve as a guide that guides a connection member during assembling.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A connecting structure for a heavy vehicle comprising:
    a floor frame;
    a side pillar; and
    a skirt rail having a side rail to be selectively connected with the floor frame and an upper rail to be selectively connected with the side pillar;
    wherein the floor frame and the side rail are joined together by a first fastening member and the side pillar and the skirt rail are joined to each other by a second fastening member;
    wherein the first fastening member is a bolt having a bolt head mounted inside the side rail;
    wherein a bolt carrier is provided between the side rail and the bolt to couple the bolt to the side rail;
    wherein the bolt includes a protrusion having a slanted surface; and
    wherein the protrusion is coupled with the bolt carrier.

2. The connecting structure for the heavy vehicle of claim 1, further including:
    a floor bracket coupled with the floor frame, wherein the floor bracket is joined to the side rail.

3. The connecting structure for the heavy vehicle of claim 2, wherein the side rail is formed in a length direction of the vehicle.

4. The connecting structure for the heavy vehicle of claim 1, further including:
    a side bracket coupled with the side pillar, wherein the side bracket is joined to the upper rail.

5. The connecting structure for the heavy vehicle of claim 4, wherein the upper rail is formed in a length direction of the vehicle.

6. The connecting structure for the heavy vehicle of claim 1, wherein the skirt rail includes a plurality of reinforcement panels formed therein in a length direction of the vehicle.

7. The connecting structure for the heavy vehicle of claim 1,
    wherein a carrier chamber is formed on the side rail and the bolt carrier is inserted into the carrier chamber, and
    wherein an outer surface of the bolt carrier is formed to be inclined toward the bolt head.

8. The connecting structure for the heavy vehicle of claim 7,
    wherein a portion of the side rail is inclined toward the bolt carrier, and
    wherein the outer surface of the bolt carrier is mounted onto the portion of the side rail.

9. The connecting structure for the heavy vehicle of claim 1, wherein a washer is mounted onto the protrusion and a nut is mounted onto the slanted surface.

10. A connecting structure for a heavy vehicle comprising:
    a floor frame;
    a side pillar; and
    a skirt rail having a side rail to be selectively connected with the floor frame and an upper rail to be selectively connected with the side pillar;
    wherein the floor frame and the side rail are joined together by a first fastening member and the side pillar and the skirt rail are joined to each other by a second fastening member;
    wherein the second fastening member is a bolt having a bolt head mounted inside the upper rail;
    wherein a bolt carrier is provided between the upper rail and the bolt;
    wherein a carrier chamber is formed on the upper rail and the bolt carrier is inserted into the carrier chamber;
    wherein an outer surface of the bolt carrier is formed to be inclined toward the bolt head;
    wherein a portion of the upper rail is inclined toward the bolt carrier;
    wherein the outer surface of the bolt carrier is mounted onto the portion of the upper rail;
    wherein the bolt includes a protrusion having a slanted surface; and
    wherein the protrusion is coupled with the bolt carrier and a nut is mounted onto the slanted surface.

11. The connecting structure for the heavy vehicle of claim 10, wherein a washer is mounted onto the protrusion.

12. The connecting structure for the heavy vehicle of claim 1, wherein the skirt rail is formed by a material including aluminum.

13. The connecting structure for the heavy vehicle of claim 1, wherein the floor frame is formed by a material including iron.

* * * * *